United States Patent [19]

Mayer

[11] Patent Number: 4,595,933

[45] Date of Patent: Jun. 17, 1986

[54] INK LIQUID SUPPLY APPARATUS

[75] Inventor: Edward F. Mayer, San Jose, Calif.

[73] Assignee: RICOH Systems, Inc., San Jose, Calif.

[21] Appl. No.: 731,136

[22] Filed: May 6, 1985

[51] Int. Cl.[4] .............................................. G01D 15/18

[52] U.S. Cl. ....................................... 346/75; 346/1.1; 346/140 R

[58] Field of Search ........................ 346/1.1, 75, 140 R

[56] References Cited

U.S. PATENT DOCUMENTS

| | | | |
|---|---|---|---|
| 3,761,953 | 9/1973 | Helgeson et al. | 346/75 |
| 4,067,020 | 1/1978 | Arway | 346/75 |
| 4,422,085 | 12/1983 | Sumitomo et al. | 346/140 R |
| 4,555,709 | 11/1985 | Greeson | 346/1.1 |

*Primary Examiner*—E. A. Goldberg
*Assistant Examiner*—Gerald E. Preston
*Attorney, Agent, or Firm*—Flehr, Hohbach, Test, Albritton & Herbert

[57] ABSTRACT

An ink liquid supply apparatus is provided for an ink jet printing apparatus which maintains the concentration of ink in the system at a constant value and allows utilization of an ink which contains a non-water soluble dye, resulting in a more permanent, quicker drying ink. The ink liquid supply apparatus functions to maintain the ink concentration constant by utilizing an ink emulsion which is in complete equilibrium with a hydrocarbon liquid and a water supply.

9 Claims, 1 Drawing Figure

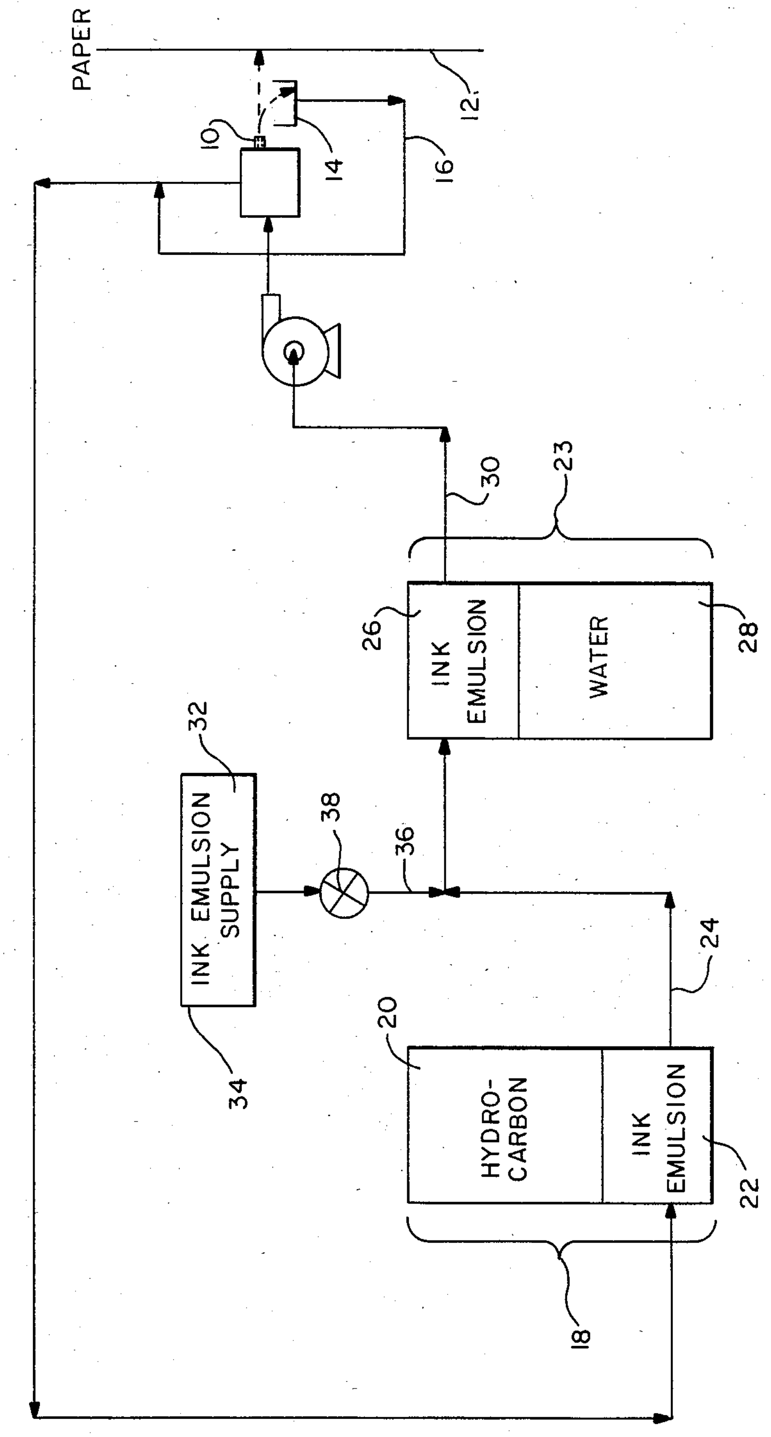
PAPER
12
10
14
16
30
23
26
INK EMULSION
WATER
28
32
INK EMULSION SUPPLY
34
38
36
24
20
HYDRO-CARBON
INK EMULSION
22
18

INK LIQUID SUPPLY APPARATUS

The present invention relates to ink jet printers and more particularly to an improved ink liquid supply apparatus. This invention further relates to an ink liquid supply apparatus which maintains the quality of the ink for an ink jet printer.

Problems with continuous ink jet printers result from evaporation of solvent from the ink at the print head. As a result, the recirculated ink from the print head becomes more viscous, thus affecting ink drop formation and consequently the quality of jet printing. Eventually, viscosity of the ink becomes high enough to cause malfunctioning in the ink system, particularly at the ink jet.

Inks which are usually used in ink jet printers are concentrated, aqueous organic solutions containing water as the major component. Aqueous inks are less permanent and slower drying than inks utilizing organic solvents and also generally contain a water soluble dye. It would thus be desirable to provide a method for using organic solvent inks which do not require water soluble dyes to improve the permanency and drying time.

OBJECT AND SUMMARY OF THE INVENTION

It is, therefore, an object of the present invention to provide an ink liquid supply apparatus for an ink jet printing apparatus which provides stable operation of the ink jet printing apparatus.

It is the further object of the present invention to provide a method for maintaining the concentration of the ink contained in an ink liquid supply apparatus at a constant value.

It is still another object of the present invention to provide an ink liquid supply apparatus for an ink jet printing apparatus comprising a non-water soluble dye.

The present invention in its preferred embodiment provides an ink liquid supply apparatus for an ink jet printing apparatus in which an ink emulsion is circulated so that it contacts both a hydrocarbon liquid supply and a water supply. The ink emulsion in its preferred embodiment is in complete equilibrium with the hydrocarbon liquid supply and the water supply so that as long as the form and concentration of the emulsifiers remain unchanged the concentrations of the aqueous and organic solvent components of the ink emulsion remain constant. If any emulsifier changes in form or concentration, a new balance between the aqueous and organic solvent components of the ink emulsion and the respective interfaces of the hydrocarbon liquid supply and water supply is automatically established by addition or expulsion of water or solvent. The present invention thus further provides a method for utilizing an ink containing a non-water soluble dye, resulting in a more permanent ink in which water is only a carrier.

In a preferred embodiment the ink liquid supply apparatus comprises an ink collecting means disposed adjacent to the ink jet. It further comprises a first conduit means for circulating ink emulsion from the ink collecting means to a hydrocarbon liquid receptacle containing a hydrocarbon liquid supply on the top layer and an ink emulsion on the bottom layer.

The ink liquid supply apparatus according to the present invention also comprises a water receptacle containing a water supply on the bottom layer and an ink emulsion on the top layer with a second conduit means connecting the hydrocarbon receptacle to the water receptacle. Finally, the ink liquid supply apparatus comprises an ink emulsion supply tank containing a stable ink emulsion supply which communicates with the second conduit means to supply the ink liquid supply apparatus with stable ink emulsion.

BRIEF DESCRIPTION OF DRAWING

The accompanying FIGURE is a schematic diagram of an ink liquid supply apparatus according to the present invention for an ink jet printing apparatus including the hydrocarbons liquid receptacle and water receptacle with a second conduit means connecting the lower layer of liquid contained in the hydrocarbon liquid receptacle with the upper layer of liquid contained in the water receptacle.

DESCRIPTION OF THE PREFERRED EMBODIMENTS

Referring to the FIGURE, there is illustrated a schematic diagram of one embodiment of the present invention. Ink jet 10 emits an ink stream for the purpose of forming ink drops, some of which are deposited on a print receiving member 12 and some of which are intercepted by an ink collecting tray 14. The ink which is caught by the ink collecting tray 14 is recirculated through first conduit 16 to hydrocarbon liquid receptacle 18. Hydrocarbon liquid receptacle 18 is comprised of a hydrocarbon liquid supply layer 20 as the top layer and an ink emulsion layer 22 as the bottom layer. Water receptacle 23 is comprised of two liquid layers, an ink emulsion layer 26 as the top layer with a water supply layer 28 as the bottom layer.

The ink emulsion passes through hydrocarbon liquid receptacle 18 in a manner such that it contacts with hydrocarbon liquid supply 20. Second conduit 24 connects the lower ink emulsion layer 22 of hydrocarbon liquid receptacle 18 to the upper ink emulsion layer 26 of water receptacle 23.

Third conduit 30 connects water receptacle 23 to ink jet 10 so that the stable ink emulsion can be circulated back through ink jet 10 for use on print receiving member 12. Ink emulsion is replenished to the ink liquid supply system from ink emulsion supply tank 34 which contains a stable ink emulsion supply 32. Pipe 36 permits ink emulsion supply tank 34 to communicate with second conduit 24. Ink emulsion is supplied to the ink liquid supply apparatus by opening valve 38, thus permitting the ink emulsion to flow into second conduit 24.

In a preferred embodiment the ink emulsion comprises at least one emulsifier. The ink emulsion temperature will usually be maintained in the range from about 15° C. to about 35° C. The ink emulsion in the preferred embodiment is a middle phase microemulsion i.e., a microemulsion which is in complete equilibrium with the hydrocarbon liquid supply and the water supply.

While the present invention has been described with reference to a preferred embodiment, the description is illustrative of the invention and is not to be construed as limiting the invention. Various modifications may occur to those skilled in the art without departing from the true spirit and scope of the invention as defined by the appended claims.

What is claimed is:

1. An ink liquid supply apparatus for an ink jet printing apparatus, said ink liquid supply apparatus comprising:

ink collecting means disposed adjacent to an ink jet,
a first conduit means for circulating ink from said ink collecting means to a hydrocarbon liquid receptacle, said hydrocarbon liquid receptacle containing a hydrocarbon liquid supply on the top layer and an ink emulsion on the bottom layer, a water receptacle containing a water supply on the bottom layer and an ink emulsion on the top layer, a second conduit means connecting said hydrocarbon liquid receptacle to said water receptacle, a third conduit means connecting said water receptacle to said ink jet, an ink emulsion supply system comprising an ink emulsion supply tank containing a supply of stable ink emulsion communicating with said second conduit means.

2. An apparatus according to claim 1 wherein said second conduit provides communication between the lower layer of liquid contained in said hydrocarbon liquid receptacle with the upper layer of liquid contained in said water receptacle.

3. An apparatus according to claim 1 further comprising valve means disposed between said ink emulsion supply tank and said second conduit.

4. An apparatus according to claim 1 wherein said ink emulsion comprises at least one emulsifier.

5. An apparatus according to claim 4 wherein said ink emulsion temperature is in the range from about 15° C. to about 35° C.

6. An apparatus according to claim 4 wherein said ink emulsion is a middle phase microemulsion.

7. A method for maintaining an ink liquid supply apparatus for an ink jet printing apparatus comprising the steps of:

(a) contacting an emulsion of said ink with a hydrocarbon liquid to obtain equilibrium of said hydrocarbon liquid with said emulsion, (b) contacting said emulsion with water to obtain equilibrium of said water with said emulsion, (c) providing said equilibrated ink to an ink jet for recording on print medium.

8. The method according to claim 8 further comprising the step of replenishing said ink liquid supply apparatus with an ink emulsion.

9. The method according to claim 8 wherein said ink emulsion comprises at least one emulsifier.

* * * * *

UNITED STATES PATENT AND TRADEMARK OFFICE

CERTIFICATE OF CORRECTION

PATENT NO. : 4,595,933

DATED : June 17, 1986

INVENTOR(S) : Mayer

It is certified that error appears in the above—identified patent and that said Letters Patent is hereby corrected as shown below:

On first page, at item 73 Assignee, should read as follows:

Ricoh Systems, Inc., San Jose, California and Ricoh Company, Ltd., Tokyo, Japan

Signed and Sealed this

Eighteenth Day of November, 1986

*Attest:*

DONALD J. QUIGG

*Attesting Officer* *Commissioner of Patents and Trademarks*